UNITED STATES PATENT OFFICE.

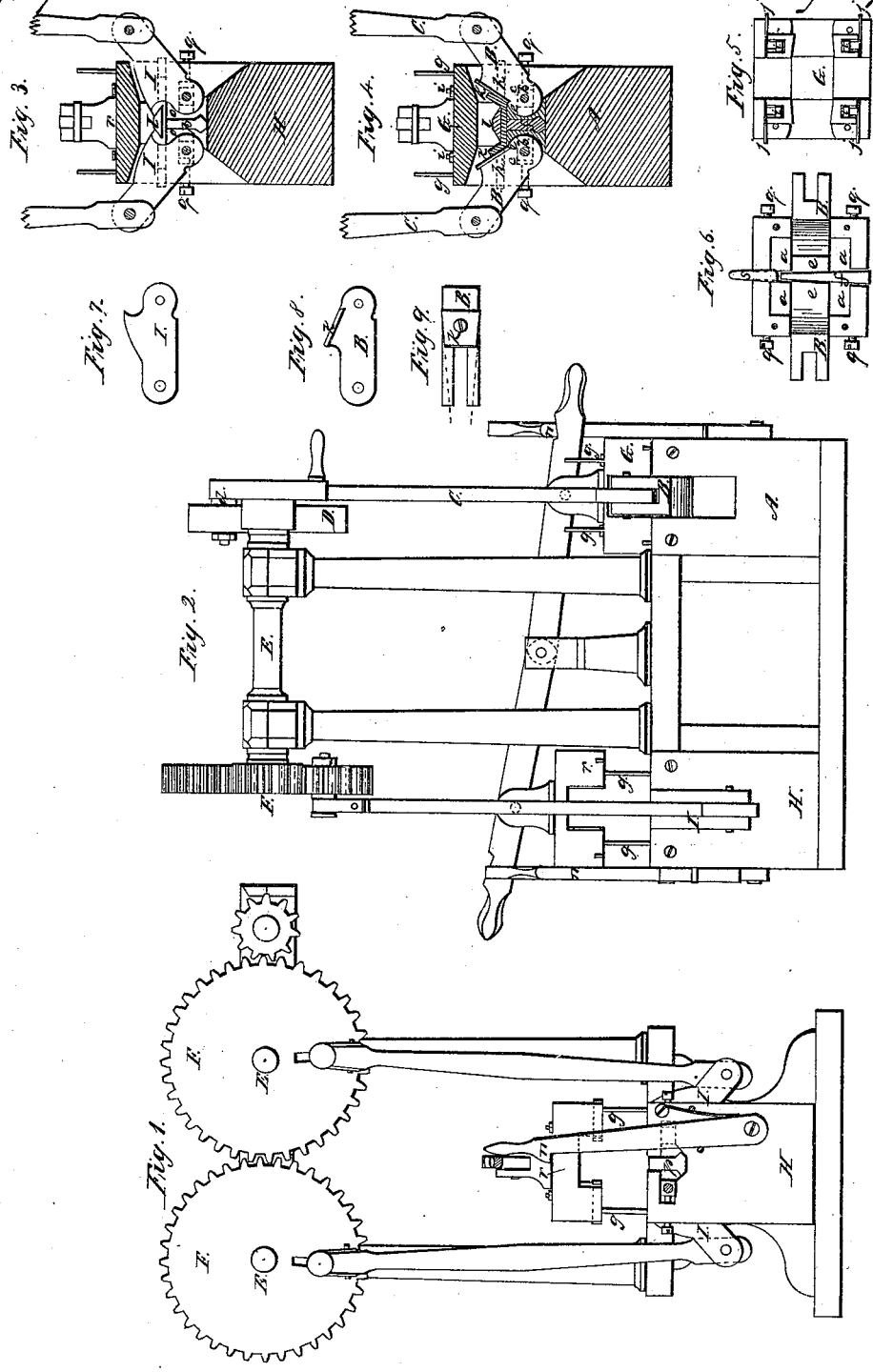

ROBERT GRIFFITHS, OF NEWPORT, KENTUCKY.

MACHINE FOR MAKING WROUGHT-IRON RAILROAD-CHAIRS.

Specification of Letters Patent No. 9,195, dated August 17, 1852.

*To all whom it may concern:*

Be it known that I, ROBERT GRIFFITHS, of Newport, in the county of Campbell and State of Kentucky, have invented certain new and useful Improvements in Machinery for Cutting and Bending Wrought-Iron Plates for Railroad-Chairs; and I do hereby declare that the following is a full and exact description thereof, reference being had to the accompanying drawings and to the letters of reference marked thereon, in which—

Figure 1. is a front elevation of the machine showing the various parts in position to receive the plate of metal to have the clips bent. Fig. 2. is a side elevation showing the bending part of the machine in the same position described in Fig. 1, and the shearing part as having performed its office of slitting the plate and raising the clip to an angle of about 50 degrees preparatory to being bent to clamp the rail. Fig. 3. is a vertical section taken through the center of the bending head parallel to its front with the benders clamping the plate and mandrel having completed the chair. Fig. 4. is a vertical section taken through the center of the cutting or shearing head the shears having cut and raised the clip to the proper angle to be afterward turned by the benders. Fig. 5. is an inverted plan of the cap (which is brought down and locked on the top of the plate of iron to be operated on to secure it in its place) showing the four knives or adjustable cutting edges of peculiar form. Fig. 6. is a plan of the top of one of the heads or pedestals on which the iron is placed to be cut or bent. Fig. 7. is a detached view of one of the benders. Fig. 8. a detached view of one of the shears. Fig. 9. is a top or face view of one of the shears showing the peculiar form of the cutting edges.

The nature of my invention consists first in a combination of devices whereby my machine is rendered capable of adjustment for cutting and turning the clips of a wrought iron railroad chair of varied forms and of any required size to fit the various sizes and patterns of rails in use; secondly in so forming and operating the cutting edges that they shall shear the plate in such lines, that when cut it shall be perfectly free from the dies and not remain in contact with them to draw the temper and render them incable of making a smooth cut as is the case with other machines heretofore used for this purpose.

To enable others to make and use my invention I will proceed to describe the construction and operation of the machine together with my improvements.

For performing the first operation upon the plate (that of cutting and raising the clip to a suitable angle to be afterward bent) I construct a solid head or pedestal A with a slight recess $a$, in the top to receive the plate of iron, across the upper end of this pedestal from side to side is a space cut out of about one third the width of the head and of sufficient depth to receive the knuckle-jointed shears B, having their fulcra in adjustable boxes $b$, fitted in slots $c$, in the front and back of said head, one shear on either side; to the outer end of these shears are attached rods C, connecting them with wrist pins $d$, on the flanges D, fast on the ends of two horizontal parallel shafts E, overhead revolving in opposite directions by means of a pair of spur wheels F, on said shafts and which cause said outer ends of the shears to describe the arc of a circle back and forth, raising the face or cutting part of the shears toward each other to an elevation of about 50 degrees; between the knuckles of these shears in the center of the pedestal is a cavity which I fill up with two dies $e$, and a wedge $f$, so that at whatever distance apart the fulcra of the shears may be set to suit the width of the chair required these dies can be adjusted by means of the wedge to fill the cavity, their object is to prevent the plate from being pressed down in the center while cutting and giving it a rolling base, instead of a flat and solid one, which would be the certain result if there were no dies to support it, or, if they were not adjustable to fill the entire cavity at any required set of the shears; they also serve to keep the boxes in which the shears and benders have their fulcra back against the adjusting set screws. These dies are formed with the top, bottom, and inner side at right angles to each other, and the outer side semi-circular-concave fitting around the knuckle joints of the shears, the inner side of each having a slight draft from front to back corresponding with the draft of the wedge;

said wedge is made with an angular or other shaped feather on either side fitting in corresponding grooves in the dies, which serve to keep them all on the same level and prevent any irregularity in the under side of the chair; above this pedestal is a movable cap G, made to slide up and down on four guide rods g, its under side is cut across from side to side, corresponding with the upper end of the pedestal to give room for the shears to rise, and from front to back to allow of the introduction of a mandrel if required to keep the center of the plate solid on the dies beneath; in the four corners, recessed level with the under side of the cap, I fix steel cutters h the cutting edges being those on the lines from side to side of the cap, they incline toward each other at their outer corners and are beveled off so as to present a keen cutting edge on the under side, they are attached to the cap by square shouldered bolts i with countersunk heads fitting in slots in the cutter, each cutter is set up by a bevel wedge j, at its back to compensate for the wear of grinding the edge; corresponding with these cutters in the cap, are steel plates k on the upper side of the shears which are made narrower at their outer end, than at the inner, and consequently cut the clip of the chair narrowest at the point which is turned up, it will be evident then that as these two clips on opposite sides of the plate are elevated to the desired angle as shown in the drawing, every point on their edges will be moved more or less (in proportion to its elevation) toward the center of the cap, and as the space between the cutters in the cap gradually widens toward their inner corners the cap will be free to lift independent of the plate, leaving it on the pedestal to be removed by hand instruments; whereas if these cutting edges were on two parallel lines from side to side of the cap, the clip would be cut straight and when raised up to its proper angle, the space between the cutters in the cap, being equal from side to center, they would in being raised either scrape the edges of the clips or more probably, lift the plate with it when it would be both awkward and difficult to free it and being hot would soon draw all the temper from the cutters, and render them incapable of making a smooth cut.

At the opposite end of the machine is another pedestal or head H, fitted with center dies o, adjusting wedge p, set screws q, sliding cap r, and cutters, exactly like those already described, and it is deemed any further notice of them here would be superfluous, this head however instead of having shears as in the other, for cutting the plate, is fitted with hook shaped benders I, on either side which have a similar motion to that of the shears, imparted by similar devices as shown in the drawing, these hook shaped benders are of suitable form to bend the clip around a mandrel l of the exact size and shape of the part of the rail that the chair is intended to fit; the action of the benders is made to alternate with that of the shears so as to equalize the power required to work the machine. By those unacquainted with the practical difficulties encountered in thus operating on iron, it might be deemed unnecessary to use the cutters as described in the cap of this bending head, but in case the shears should not have cut the clip quite far enough, or otherwise not performed the duty ascribed to them in a perfect manner, owing to the cutters getting out of order, the introduction of them into this part also would enable the machine to perfect the chair which might otherwise have been a waste.

In operating the machine the plates of iron being first cut off in regular and suitable sizes they are heated in a furnace, the cap of the shearing pedestal raised, and a plate laid in the recess on the top of the pedestal, the cap is then weighed down and secured by the spring catch m, for that purpose; the machine being now in motion, the shears in rising toward each other make a double cut in each side of the plate, at the same time bending the part up to form the clip of the chair to the desired angle of elevation, which may be regulated by the pitch given to the cutters on the face of the shears, this being performed the shears recede, the cap is liberated from the catch and raised, leaving the plate on the top of the pedestal, when it must be removed into the recess in the face of the other pedestal and secured there in like manner by bringing the cap down upon it which is then secured by the spring catch n, the mandrel l, of the size and form of the part of the rail the chair is intended to fit, is then introduced on the top of the plate, through the space in the cap from front to back of the pedestal, and is held there by a catch or hook s, at the back of the plate, while the benders in their regular action, describing the arc of a circle bend the clips over the mandrel and afterward work back and recede, the cap is then liberated and raised, the chair taken out on the mandrel, which is made slightly taper so as to drive out freely, when the chair may have the usual spike holes punched in it in order to perfect it.

Having thus described my invention what I claim therein as new and desire to secure by Letters Patent is—

1. The combination of the feathered wedge and dies as described for filling the cavity between and fitting around the knuckle end of the shears and benders forming an adjustable, solid, and level bed, for the center of the plate while being cut and bent and preventing the fulcra of the shears and benders from moving toward the center away from the set screws.

2. I claim furnishing the caps of the pedestals with adjustable cutters the cutting edges of which are nearer to each other at the outer than at the inner end, and which shear the plate in conjunction with the cutters on the face of the shears which are narrower at their outer than their inner end, in order to cut the clip of the chair narrowest at the point and thereby leave it perfectly free and clear of the cutters in the cap so that the cap will lift, free from the plate.

In testimony whereof I have hereunto signed my name before two subscribing witnesses.

ROBERT GRIFFITHS.

Witnesses:
A. E. H. JOHNSON,
WM. M. SMITH.